(12) United States Patent
Stewart et al.

(10) Patent No.: US 9,969,311 B2
(45) Date of Patent: May 15, 2018

(54) EASY INSTALL TRAY TABLE

(71) Applicant: Zodiac Seats US LLC, Gainesville, TX (US)

(72) Inventors: Christopher D. Stewart, Saint Jo, TX (US); Eric L. Parks, Denton, TX (US); John D. Allen, Sanger, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 0 days. days.

(21) Appl. No.: 15/112,231

(22) PCT Filed: Feb. 11, 2015

(86) PCT No.: PCT/US2015/015377
§ 371 (c)(1),
(2) Date: Jul. 18, 2016

(87) PCT Pub. No.: WO2015/123271
PCT Pub. Date: Aug. 20, 2015

(65) Prior Publication Data
US 2016/0332550 A1    Nov. 17, 2016

Related U.S. Application Data

(60) Provisional application No. 61/938,553, filed on Feb. 11, 2014.

(51) Int. Cl.
*B60N 3/00* (2006.01)
*B64D 11/06* (2006.01)
(Continued)

(52) U.S. Cl.
CPC ............... *B60N 3/004* (2013.01); *A47B 5/02* (2013.01); *A47B 5/04* (2013.01); *B64D 11/0638* (2014.12); *Y02T 50/46* (2013.01)

(58) Field of Classification Search
CPC .. A47C 7/06; A47C 7/10; A47B 85/00; A47B 5/00; A47B 5/06; B64N 3/004; B64D 11/0638; B60N 3/004
(Continued)

(56) References Cited

U.S. PATENT DOCUMENTS 4,037,896 A * 7/1977 Kennedy, Jr. ............ A47B 5/04
108/159
4,511,178 A * 4/1985 Brennan ................. B64D 11/06
297/146

(Continued)

FOREIGN PATENT DOCUMENTS

WO    2011041343    4/2011

OTHER PUBLICATIONS

International Patent Application No. PCT/US2015/015377, Search Report and Written Opinion dated May 15, 2015.

(Continued)

*Primary Examiner* — Jose V Chen
(74) *Attorney, Agent, or Firm* — Kilpatrick Townsend & Stockton LLP; Dean W. Russell; Davidson G. Lucas

(57) ABSTRACT

Described are passenger seat backs having tray tables pivotally coupled to the seat back frame and which rotate about a single axis. The tray table (20) may be directly connected to the seat back frame (10) without the need for a complex and heavy multi-axis pivot. The resulting seat and associated tray table are lighter, more compact, and easier to manufacture.

20 Claims, 15 Drawing Sheets

(51) Int. Cl.
*A47B 5/02* (2006.01)
*A47B 5/04* (2006.01)

(58) Field of Classification Search
USPC ...... 297/173, 146, 163, 170; 108/47, 44, 48, 108/152
See application file for complete search history.

(56) References Cited

U.S. PATENT DOCUMENTS

| | | | | |
|---|---|---|---|---|
| 4,792,183 A * | 12/1988 | Townsend, III | ....... | B60N 3/004 108/27 |
| 5,169,209 A | 12/1992 | Beroth | | |
| 5,540,483 A * | 7/1996 | Marechal | ................ | B60N 2/23 297/169 |
| 5,695,240 A * | 12/1997 | Luria | .................... | B60N 3/004 297/163 |
| 5,709,155 A * | 1/1998 | Terracciano | ............. | A47C 7/70 108/152 |
| 5,876,092 A * | 3/1999 | An | ........................ | B60N 3/004 297/146 |
| 6,837,467 B2 * | 1/2005 | Cheng | ................. | A47B 46/005 108/108 |
| 7,658,153 B1 * | 2/2010 | Patoka | ................... | B60R 11/00 108/152 |
| 8,336,957 B2 * | 12/2012 | Roy | ........................ | B60N 2/24 297/163 |
| 8,479,664 B2 * | 7/2013 | Nelson | .................... | A47B 5/04 108/135 |
| 8,702,163 B2 * | 4/2014 | Westerink | ............. | B60N 3/004 297/146 |
| 8,870,279 B2 * | 10/2014 | Suhre | .................... | B60N 3/004 297/163 |
| 9,169,965 B2 * | 10/2015 | Hardikar | ................ | B60N 3/004 |
| 2003/0106475 A1 * | 6/2003 | Chen | ...................... | A47B 5/006 108/134 |
| 2003/0193220 A1 * | 10/2003 | Jensen | ..................... | A47C 7/38 297/146 |
| 2010/0060044 A1 | 3/2010 | Pozzi et al. | | |
| 2012/0139303 A1 * | 6/2012 | Westerink | .......... | B64D 11/0015 297/163 |
| 2012/0212012 A1 * | 8/2012 | Berger | ............... | B64D 11/0015 297/163 |
| 2013/0001987 A1 * | 1/2013 | Heredia | ............ | B64D 11/0015 297/163 |
| 2013/0169009 A1 * | 7/2013 | Petersen | ............ | B64D 11/0638 297/163 |
| 2014/0292042 A1 * | 10/2014 | Stewart | .................. | B60N 3/004 297/163 |

OTHER PUBLICATIONS

International Patent Application No. PCT/US2015/015377, International Preliminary Report on Patentability, dated Aug. 25, 2016.

* cited by examiner

EASY INSTALL TRAY TABLE

CROSS REFERENCE TO RELATED APPLICATIONS

This application is the U.S. national phase entry of International Patent Application Serial No. PCT/US2015/015377 ("the '377 application"), filed on Feb. 11, 2015, which application is related to and claims priority benefits from U.S. Provisional Application Ser. No. 61/938,553 ("the '553 application"), filed on Feb. 11, 2014, entitled Easy Install Tray Table. The '377 and '553 applications are hereby incorporated in their entirety by this reference.

FIELD OF THE INVENTION

The field of the invention relates to passenger seats or the like, and more particularly to tray tables for use with passenger seats.

BACKGROUND

Many passenger seats such as those on passenger aircraft, buses, trains, and the like are arranged so that each passenger seat, other than the forward-most located passenger seats, faces the back of the next forward passenger seat. To increase a passenger's comfort, many passenger seat backs rotate between upright and reclined positions.

In some instances, a tray table may be mounted adjacent to the back of each passenger seat for use by a passenger in the next aft passenger seat. The tray table is deployed by the passenger to provide a relatively flat surface for eating, working, recreation, or other uses.

In many conventional uses, the tray table may be mounted to the back of each passenger seat via a pair of retractable arms that allow the tray table to be pulled toward the passenger while deployed. Conventionally, the tray tables are mounted indirectly to the base of the passenger seat, and are not mounted to the seat back frame of the passenger seat. This allows the seat back to recline while not affecting the use of the tray for an aft passenger. The separation of seat back frame and tray table also helps to isolate the tray table from vibration or other disturbances.

Recently, there has been movement in carrier industries away from passenger comfort and convenience towards light-weight, compact seating arrangements. Many common carriers have moved away from reclining seats, particularly on shorter routes, to allow for lighter seats and reduced space requirements for passengers. This change in focus has led to non-reclining seats, and new opportunities for advancement of tray table technology. In particular, a tray table mounted directly to a seat back frame offers a number of advantages over conventional tray table assemblies.

The present invention discloses, among other things, a tray table that is pivotally coupled to the seat back frame of a non-reclining passenger seat. This arrangement allows for a simplified mounting and installation of the tray table, which saves weight, material costs, and labor costs during installation. A tray table pivotally coupled to the seat back frame is also a more reliable design, with fewer moving parts and potential pinch points than the traditional tray table mounting arrangements. Furthermore, pivotally coupling a tray table to a non-reclining seat back frame saves space. There is less space required between the aft edge of the seat back and the forward edge of the deployed tray table due to the fixed nature of the seat back frame. There are also opportunities for coupling the tray table to the seat back frame in such a way as to recess the tray table into the seat back in its stowed position, further reducing passenger space requirements and allowing for more compact seating arrangements.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat may comprise a tray table pivotally coupled to a seat back frame with at least one pivot bar.

In some embodiments the pivot bar comprises a protrusion.

In certain embodiments, the protrusion comprises a material selected from the group of steel, aluminum, a polymer, or a composite.

In some embodiments, the protrusion comprises a projection along its length.

In certain embodiments the protrusion comprises opposing flat surfaces and opposing curved surfaces along the length of the protrusion. The opposing flat surfaces may alternate with the opposing curved surfaces around the circumference of the protrusion.

In some embodiments, the tray table may comprise at least one tray table arm, and the at least one tray table arm comprising an aperture.

In some embodiments, the at least one tray table arm comprises a material selected from the group of steel, aluminum, a polymer, or a composite.

In certain embodiments, the aperture may be sized larger than a distance between opposing flat surfaces along a length of the protrusion and smaller than a distance between opposing curved surfaces along the length of the protrusion, where the protrusion is in communication with the seat back frame.

In some embodiments, the tray table may comprise at least one tray table arm comprising an aperture, wherein the at least one pivot bar comprises a protrusion comprising a narrowed dimension across the protrusion that is narrower than the opening of the aperture. The opening of the aperture may be narrower than all other dimensions across the protrusion.

In certain embodiments, the pivot bar may be covered by a shroud.

In some embodiments, the tray table may be secured by a down stop pin.

In certain embodiments, the tray table may be secured by a fastener.

According to certain embodiments of the present invention, a passenger seat may comprise a seat back frame comprising at least one pivot bar with a protrusion, a tray table comprising at least one tray table arm with an aperture that partially encloses a recess, wherein the protrusion is positioned within the recess. The protrusion may comprise a narrowed dimension across the protrusion that is narrower than an opening of the aperture.

In certain embodiments, the at least one pivot bar may be covered by a shroud.

In some embodiments, the tray table may be secured by a down stop pin.

In certain embodiments, the tray table may be secured by a fastener.

In some embodiments, the protrusion may comprise a projection along its length.

According to certain embodiments of the present invention, a method for manufacturing a passenger seat with a tray table pivotally coupled to a seat back frame may comprise providing a seat back frame and providing a protrusion in communication with the seat back frame. Then, the protrusion may be formed so as to have opposed surfaces along its length and opposed curved surfaces along its length, with the opposing surfaces alternating with the opposing curved surfaces around the circumference of the protrusion. It may also be necessary to provide a tray table with at least one tray table arm, that tray table arm comprising an aperture. The aperture should be sized larger than a greatest distance between the opposing flat surfaces along the length of the protrusion, and sized smaller than a distance between the opposing curved surfaces along the length of the protrusion. Then, the aperture may be aligned with the opposing flat surfaces of the protrusion and passed over the protrusion. Finally, the aperture may be rotated away from the opposing flat surfaces of the protrusion.

In some embodiments, the at least one tray table arm may be secured with a down stop pin.

In certain embodiments, the at least one tray table arm may be secured with a fastener.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide a tray table pivotally coupled to a seat back frame for passenger seats. While the tray tables are discussed for use with aircraft seats, they are by no means so limited. Rather, embodiments of the tray table may be used in passenger seats or other seats of any type or otherwise as desired.

Figure 1:
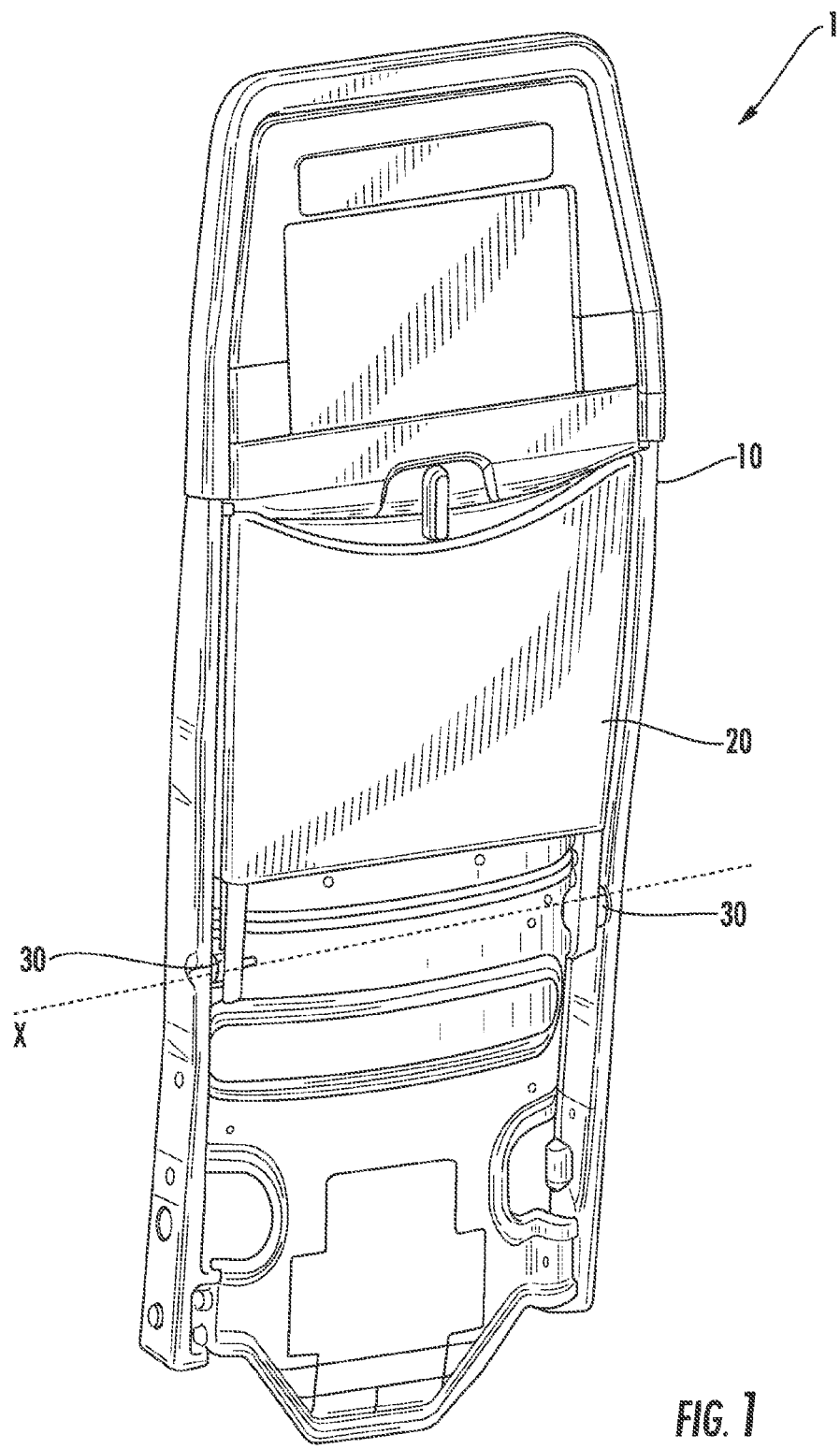
FIG. 1 is a perspective view of a passenger seat back with a tray table assembly in a stowed position, according to certain embodiments of the present invention.
Figure 2:
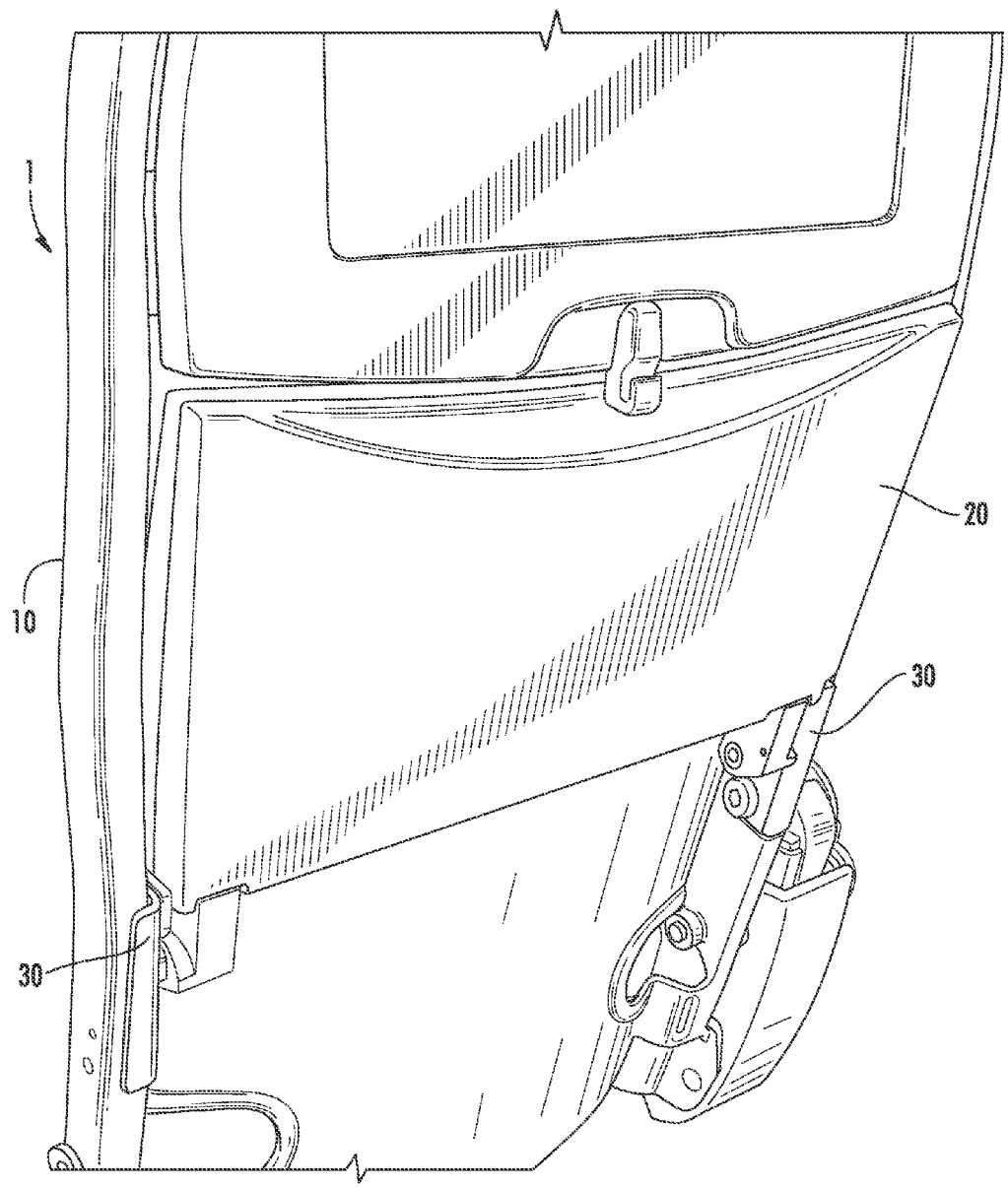
FIG. 2 is an enlarged perspective view of a passenger seat back with a tray table assembly in a stowed position, according to certain embodiments of the present invention.
Figure 3:
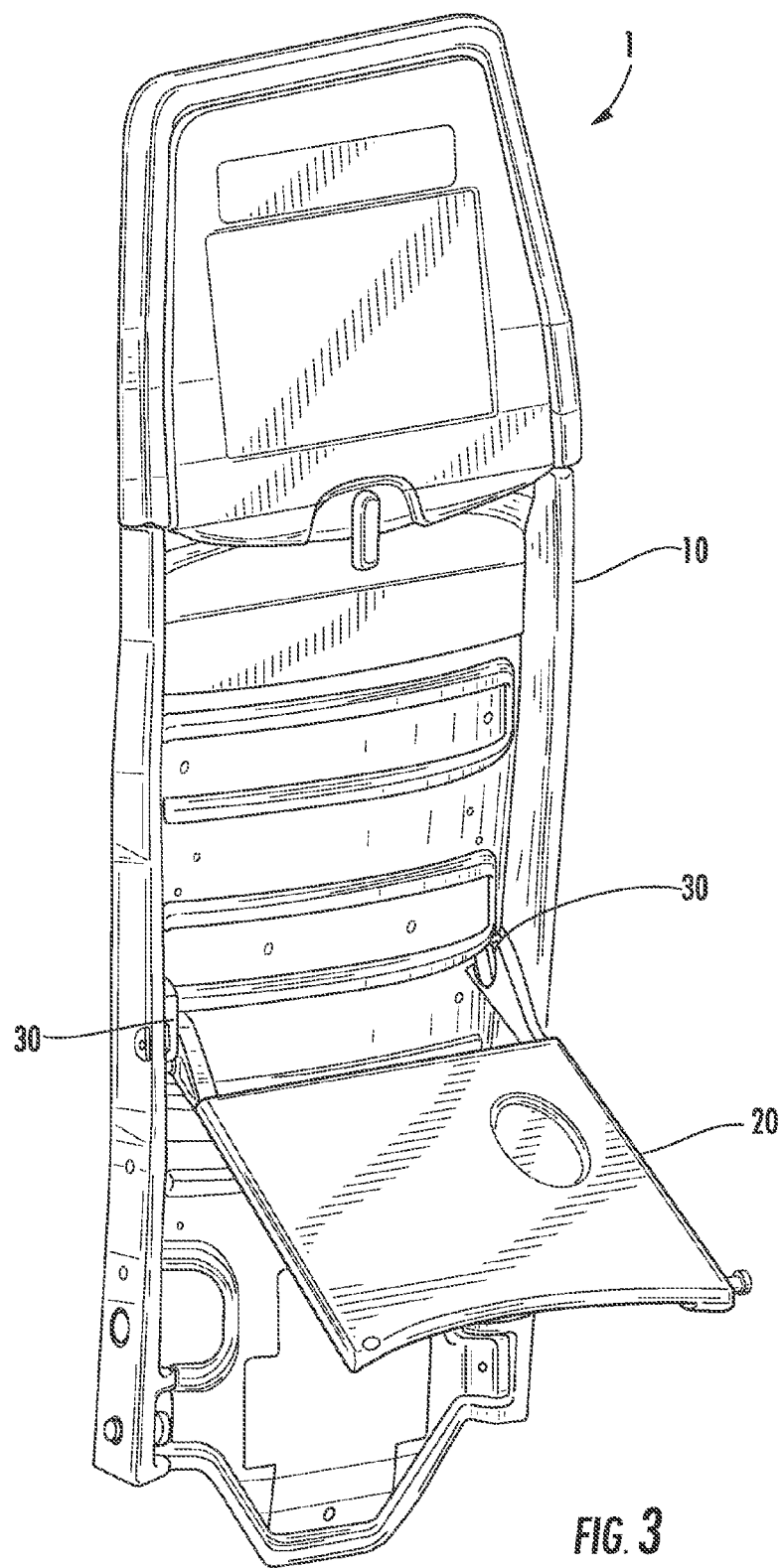
FIG. 3 is a perspective view of a passenger seat back with a tray table assembly in an installation position, according to certain embodiments of the present invention.
Figure 4:
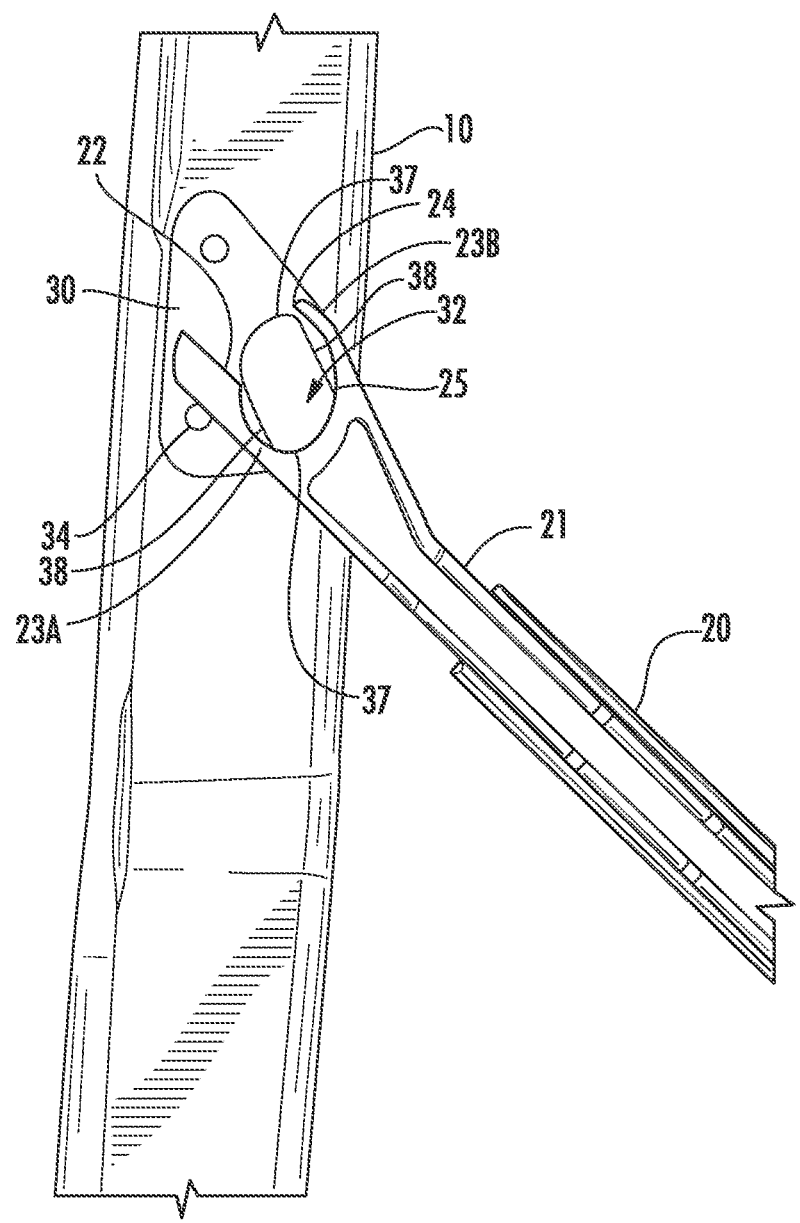
FIG. 4 is a side elevation view of a pivot bar coupling during installation, according to certain embodiments of the present invention.
Figure 5:
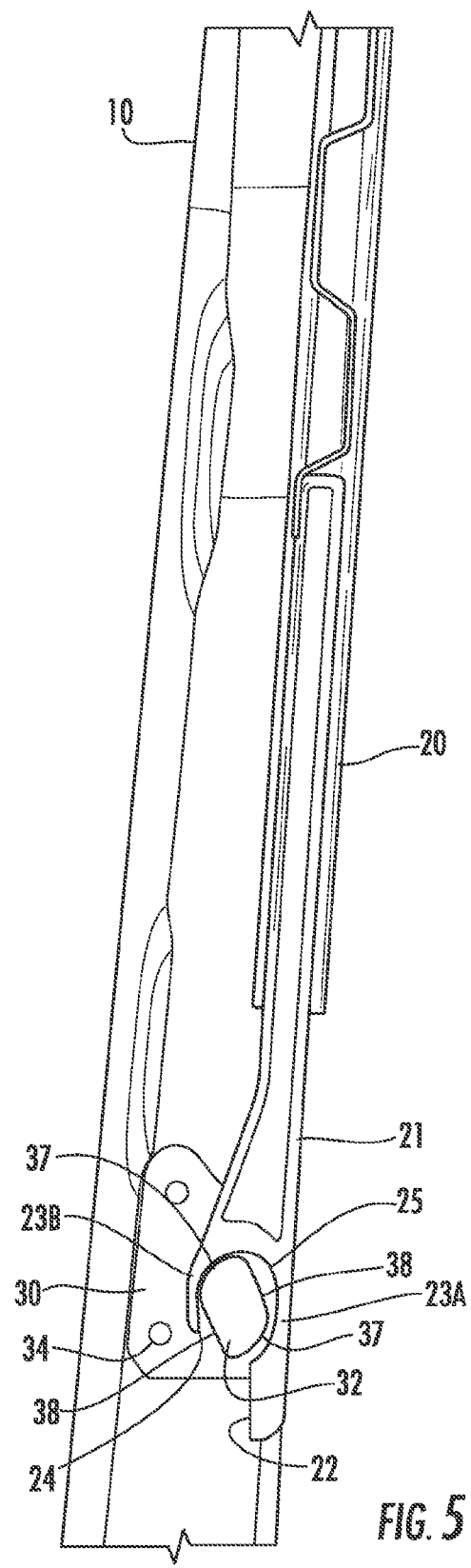
FIG. 5 is a side elevation view of a pivot bar coupling in a stowed position, according to certain embodiments of the present invention.
Figure 6:
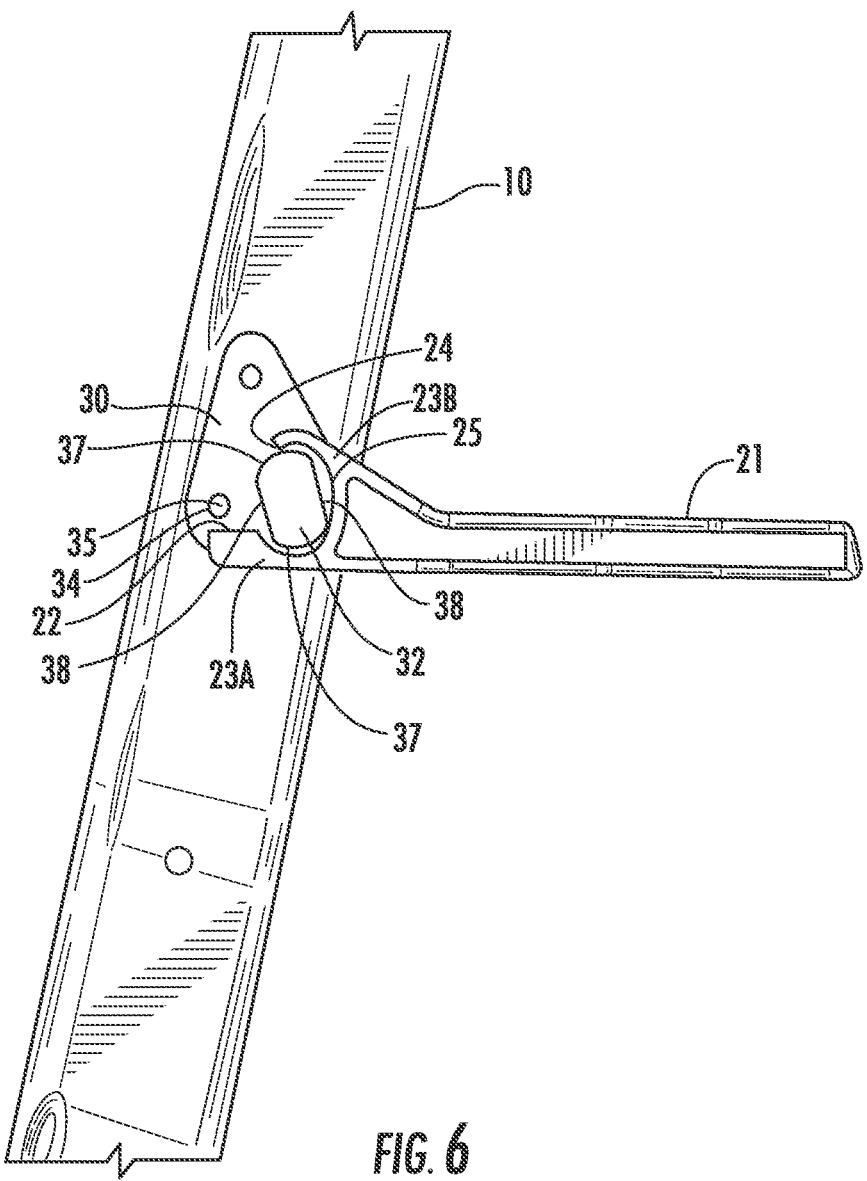
FIG. 6 is a side elevation view of a pivot bar coupling in a deployed position, according to certain embodiments of the present invention.
Figure 11:
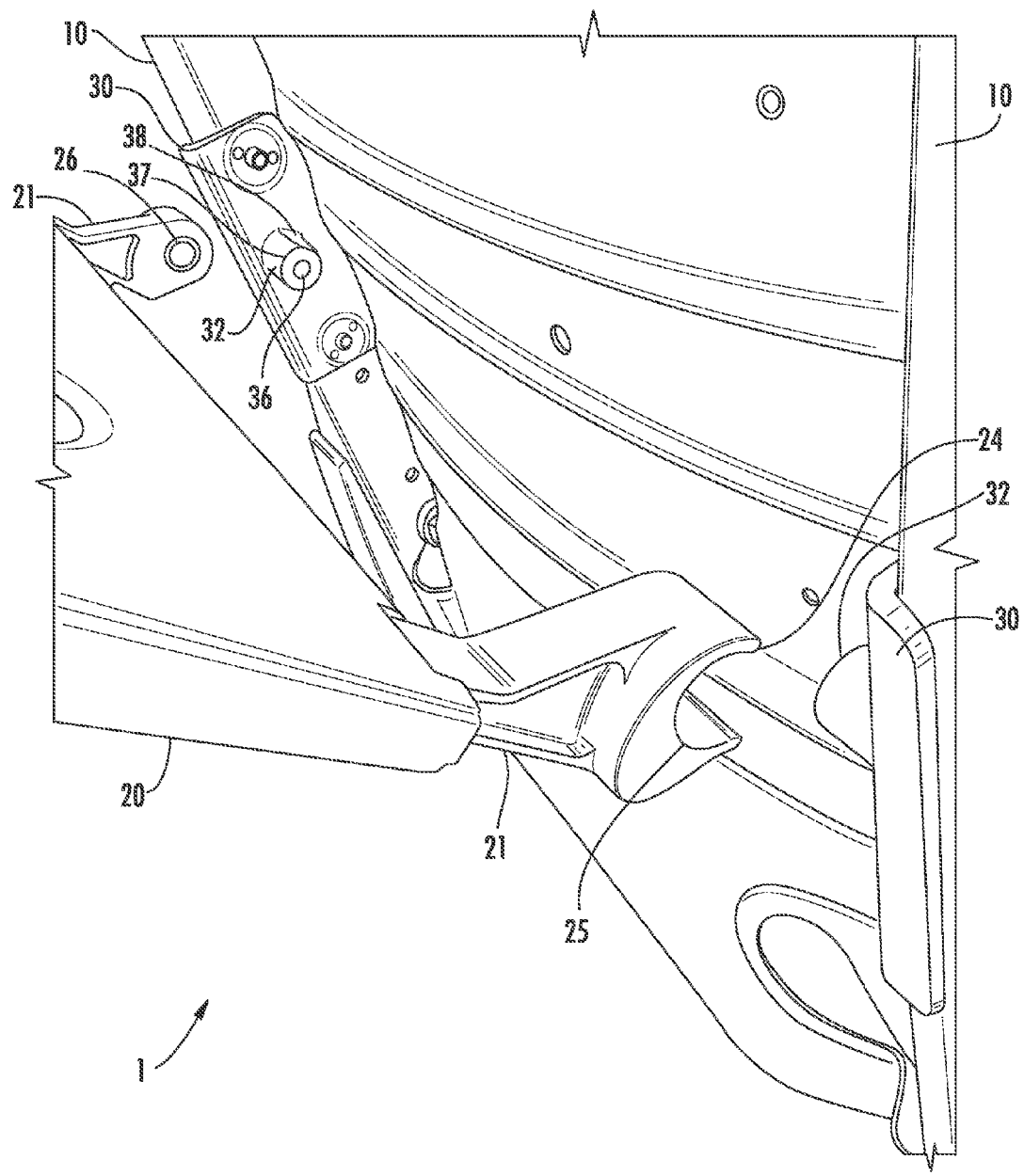
FIG. 11 is a partially exploded perspective view of a pivot bar coupling, according to certain embodiments of the present invention.
Figure 12:
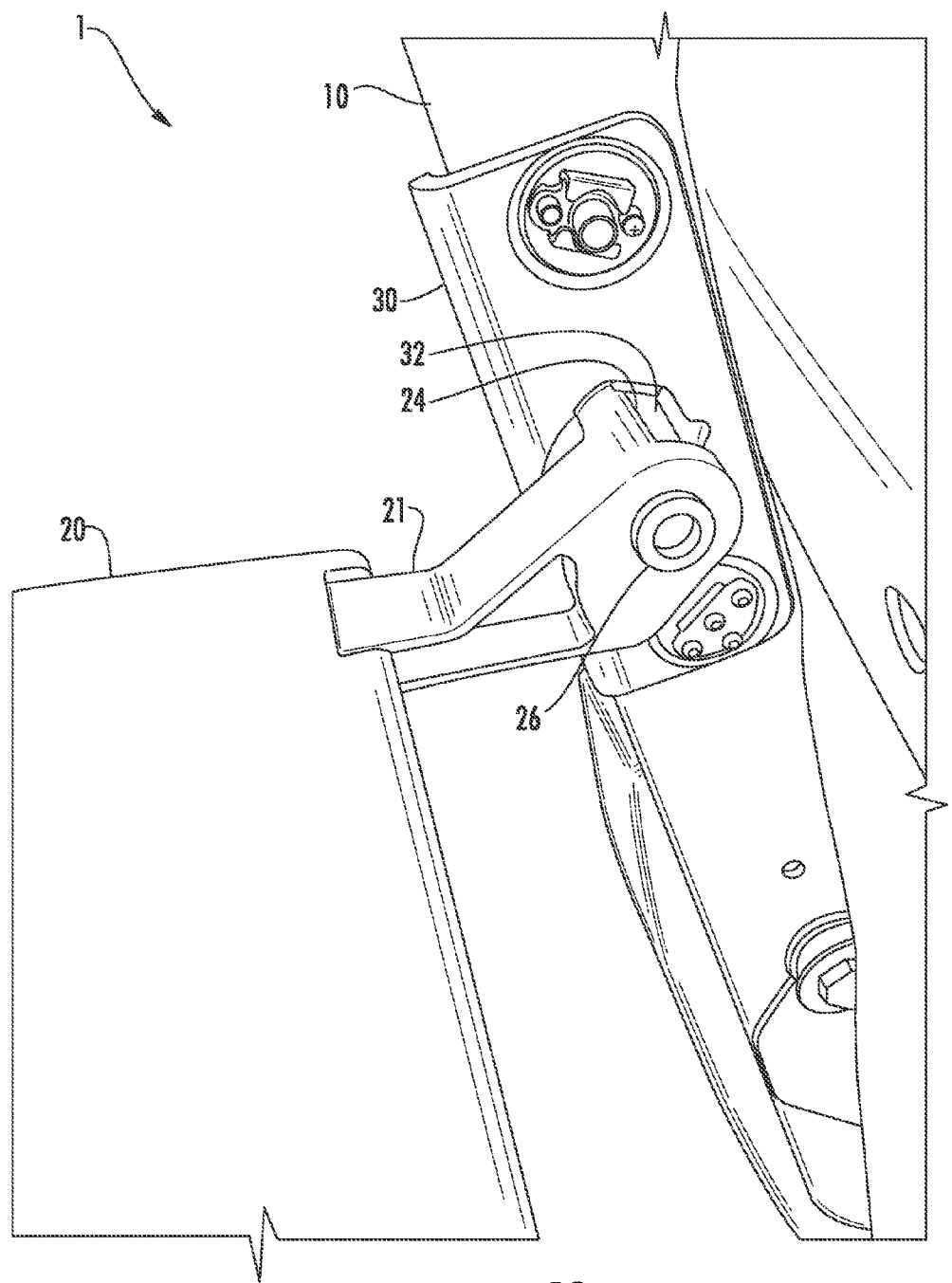
FIG. 12 is a perspective view of a pivot bar coupling, according to certain embodiments of the present invention.

In some embodiments of the present invention, as shown in FIGS. 1-6 and 11-13, a passenger seat back 1 comprises a seat back frame 10 and a tray table 20 mounted directly to the seat back frame 10. The tray table 20 is pivotally coupled to the seat back frame 10 at or near at least one pivot bar 30. The tray table 20 may rotate about the pivot bars 30 to allow the tray table 20 to move between a deployed position (as shown in FIGS. 6 and 12), a stowed position (as shown in FIGS. 1-2, 5, and 13), and an installation position (as shown in FIGS. 3-4). In certain embodiments of the present invention, the tray table 20 moves about a single pivot axis X that substantially aligns with a longitudinal axis of the pivot bars 30. It should be appreciated that in certain embodiments the seat back frame 10 may be stationary and without a reclining function. The seat back frame 10, tray table 20, and pivot bars 30 may be made from any suitable materials including but not limited to aluminum, stainless steel, nylon, aircraft steel, aramid fibers, polycarbonate, polypropylene, other metals or alloys, composites, or similar materials. Furthermore, any combination of the aforementioned materials may be used to construct the seat back frame 10, tray table 20, and pivot bars 30, and these or any other parts may be single pieces or assembled from sub-parts from any suitable materials including, but not limited to, the aforementioned materials.

The tray table 20 may be attached to the seat frame 10 or through the pivot bar 30 in a number of ways that allows the tray table 20 to rotate between the deployed and stowed positions. For example, in certain embodiments, the tray table 20 may be secured to the seat frame 10 or the pivot bars 30 via suitable fasteners, which include but are not limited to screws, bolts, rivets, or other mechanical or chemical fasteners.

According to certain embodiments of the present invention as shown in FIGS. 4-6, the tray table 20 may include a tray table arm 21, an extension 22, an aperture 24, and a recess 25. The pivot bar 30 may be attached to or part of a seat back frame 10, and may include a protrusion 32 and a down stop pin hole 34.

In some embodiments of the present invention, as shown in FIGS. 4-6, the tray table 20 is attached to the tray table arm 21. The tray table arm 21 may include a pair of prongs 23A, 23B, which are spaced apart from each other and extend outward from an end of the tray table arm 21. In some embodiments, an extension 22 may extend from an end of the first prong 23A. Internal surfaces of one or both prongs 23A, 23B may comprise a concave shape, which causes the ends of the first prong 23A and the second prong 23B to be spaced apart by a narrower distance than the space between the concave internal surfaces of the prongs 23A, 23B. The narrower distance between the ends of the first prong 23A and second prong 23B is referred to as an aperture 24, and the space formed between the concave internal surfaces of the prongs 23A, 23B and a curved end of the tray table arm 21 is referred to as a recess 25.

In certain embodiments, the protrusion 32 may be shaped to selectively engage with the aperture 24 for installation and removal purposes. For example, the protrusion 32 may include a narrowed dimension across the protrusion 32 that is narrower than the opening of the aperture 24, thus allowing the protrusion 32 to fit through the aperture 24 when the tray table arm 21 is rotated into the installation position (as shown in FIGS. 3-4). In this installation position, the narrowed dimension is aligned substantially parallel to the opening of the aperture 24.

Opposing surfaces 38 of the protrusion 32 that comprise the narrowed dimension between them may have any suitable shape so long as the maximum distance between the surfaces 38 does not exceed the narrowed dimension that is configured to fit through the aperture 24. In other words, the opposing surfaces 38 may be convex, concave, straight, parabolic, parallel, angled, or another suitable shape or orientation with respect to each other as needed for the desired outcome, so long as the maximum distance between the sides is still narrower than the opening of the aperture 24 when the maximum distance is aligned substantially parallel to the opening of the aperture 24. As a result, the protrusion 32 passes through the aperture 24 and into the recess 25 when the tray table arm 21 is rotated into the installation position.

In order to prevent the protrusion 32 from sliding through the aperture 24 when the tray table arm 21 is rotated away from installation position, the protrusion 32 is shaped so that all other dimensions across the protrusion 32 are wider than the opening of the aperture 24 when those dimensions are aligned substantially parallel to the opening of the aperture 24. As a result, the protrusion 32 is held within the recess 25 by the prongs 23A, 23B until the tray table arm 21 is rotated back into the installation position. The recess 25 may take on any number of geometries, but may be shaped to accept the protrusion 32 and allow the tray table arm 21 to rotate about the protrusion 32.

According to one exemplary embodiment, the opposing surfaces 38 may be substantially parallel, flat sides, and these opposing sides may be separated by opposing curved surfaces 37. As a result, the protrusion 32, when viewed along its longitudinal axis, may have alternating curved surfaces 37 and flat surfaces 38. The pivot bar 30 may also include the down stop pin hole 34, which is configured to receive a down stop pin (not shown in FIGS. 4 and 5).

According to some embodiments of the present invention, FIGS. 3-4 illustrate the tray table 20 during installation onto the pivot bars 30 and the seat back frame 10. For installation, the tray table 20 and tray table arms 21 are positioned in the installation position so that the maximum distance between the opposing surfaces 38 of the protrusion 32 is arranged substantially parallel to the opening of the aperture 24. The tray table 20 and the tray table arms 21 then slide over the protrusions 32 until the protrusions 32 are positioned within the recess 25 of each tray table arm 21.

The tray table arms 21 and tray table 20 are then rotated so that the opening of the aperture 24 is substantially parallel to another dimension across the protrusion 32 that is wider than the opening of the aperture 24, which prevents the protrusion 32 from exiting the recess 25 through the aperture 24. As a result, the tray table arm 21 may no longer disengage from the seat back frame 10. In this configuration, the profile of the recess 25 may be in contact with portions of the curved surfaces 37 of the protrusion 32 and thereby provide a bearing surface for rotation of the tray table arm 21 about the protrusion 32. It should be appreciated that in certain embodiments of the present invention, specialized bearing surfaces to reduce friction and wear may be incorporated onto the protrusion 32 or within the tray table arm 21. These bearing surfaces may include, but are not limited to, nylon, Teflon, other polymers, metallic bearings, dry lubricants, friction or wear reducing coatings, or any other bearing surface as desired or required for the specific application.

As shown in FIGS. 1-2, 5 and 13, the tray table 20 and tray table arm 21 are rotated into the stowed position. The protrusion 32 may not pass through the aperture 24 in this position because the dimension across the protrusion 32 that is substantially parallel to the opening of the aperture 24 is wider than the opening of the aperture 24. In this position (or any other suitable position where the extension 22 is positioned rotationally below or aft of the down stop pin hole 34), a down stop pin 35 (as shown in FIG. 6) may be inserted into the down stop pin hole 34 The down stop pin 35 may then restrict the rotation of the tray table arm 21 about the protrusion 32 into the installation position, thus preventing removal of the tray table 20 from the seat back frame 10 until the down stop pin is removed. It should be appreciated that the location of the down stop pin 35 and extension 22 may change to accommodate different design requirements or protrusion 32 configurations. By way of non-limiting example, the extension 22 may extend from the second prong 23B and the down stop pin 35 may be located to interfere with the motion of extension 22 as the tray table 20 is rotated from a stowed position to a deployed position.

FIGS. 6 and 12 illustrate the tray table 20 in the deployed position according to certain embodiments of the present invention. As shown in the embodiment illustrated in FIG. 6, the extension 22 of the tray table arm 21 contacts the down stop pin 35 inserted in the down stop pin hole 34 and prevents further rotation of the tray table 20 in that direction. Furthermore, the tray table arm 21 and tray table 20 may support loads because the down stop pin 35 will restrict rotation of the tray table arm 21 when a load is applied to the tray table 20.

According to certain embodiments of the present invention as shown in FIGS. 7-13, the tray table arm 21 may include the aperture 24, the recess 25, and a fastener hole 26. The tray table arm 21 may be formed or produced as part of the tray table 20, or may be an independent part which is affixed to the tray table 20 (not shown in FIGS. 7-10). The fastener hole 26 is located on the tray table arm 21 concentric with the axis of rotation of the tray table arm 21 about the pivot axis X (not shown). The fastener hole 26 may be unthreaded to allow the tray table arm 21 to rotate about the fastener (not shown) without binding. A variety of fasteners may be used in conjunction with the tray table arm 21, including but not limited to, bolts, screws, pins, rivets, or the like. The tray table arm 21 also features the recess 25, the surface of which is contoured to allow the surface of the recess 25 to act as a bearing surface and guide for the tray table arm 21 as it rotates about the protrusion 32.

Figure 7:
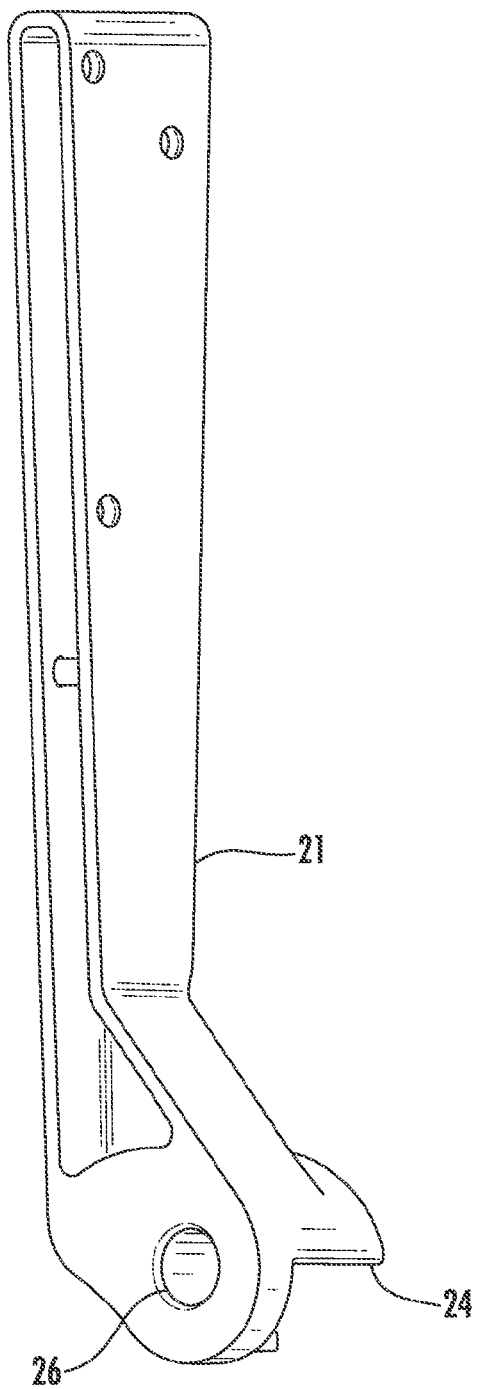
FIG. 7 is a perspective view of a tray table support arm, according to certain embodiments of the present invention.
Figure 8:
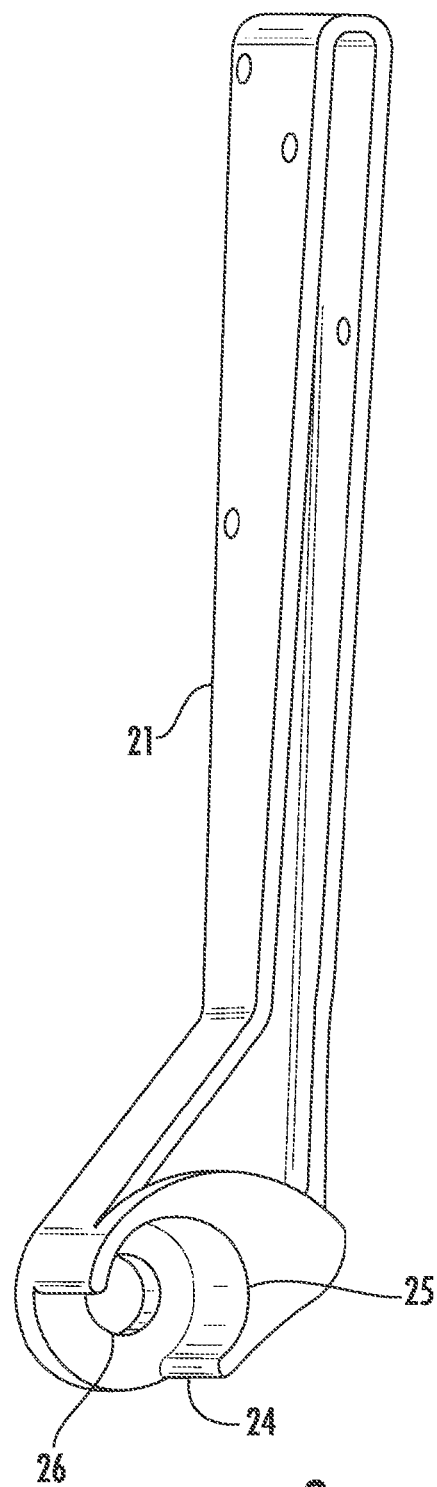
FIG. 8 is a perspective view of a tray table support arm, according to certain embodiments of the present invention.

Still referring to FIGS. 7 and 8, as described above with respect to FIGS. 4-6, the protrusion 32 may be shaped to selectively engage with the aperture 24 for installation and removal purposes. In these embodiments, the protrusion 32 may include a narrowed dimension across the protrusion 32 that allows the protrusion 32 to fit through the aperture 24 when the narrowed dimension is aligned substantially parallel to the opening of the aperture 24.

The surfaces 38 that comprise the narrowed dimension between them may have any suitable shape so long as the maximum distance between the surfaces 38 does not exceed the narrowed dimension that is configured to fit through the aperture 24. In other words, the opposing surfaces 38 may be convex, concave, straight, parabolic, parallel, angled, or another suitable shape or orientation with respect to each other as needed for the desired outcome, so long as the maximum distance between the sides is still narrower than the opening of the aperture 24 when the maximum distance is aligned substantially parallel to the opening of the aperture 24. As a result, the protrusion 32 passes through the aperture 24 and into the recess 25 in the installation position.

In order to prevent the protrusion 32 from sliding through the aperture 24 when the tray table arm 21 is rotated away from installation position, the protrusion 32 is shaped so that all other dimensions across the protrusion 32 are wider than the opening of the aperture 24 when those dimensions are aligned substantially parallel to the opening of the aperture 24. As a result, the protrusion 32 is held within the recess 25 by the size of the aperture 24 until the tray table arm 21 is rotated back into the installation position.

Figure 9:
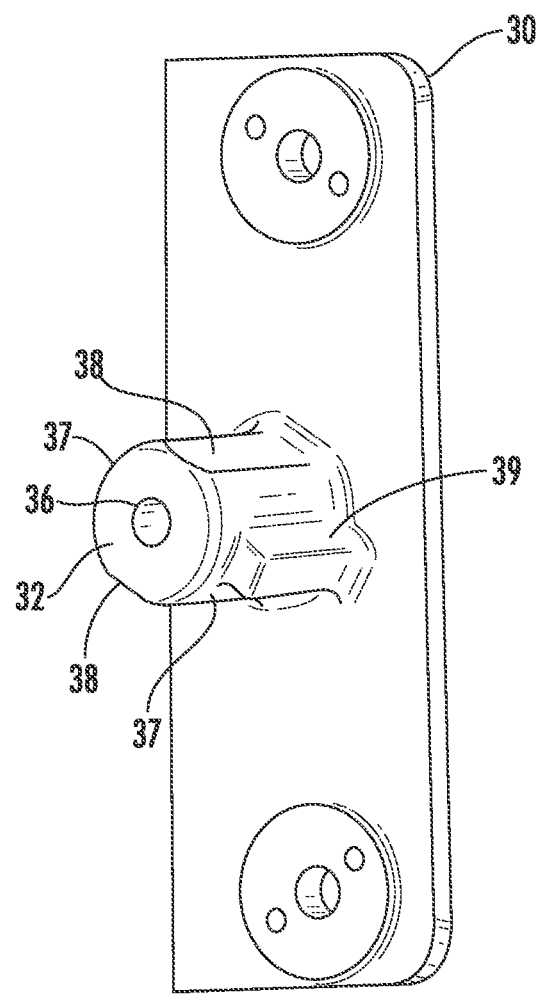
FIG. 9 is a perspective view of a tray table pivot bar component, according to certain embodiments of the present invention.
Figure 13:
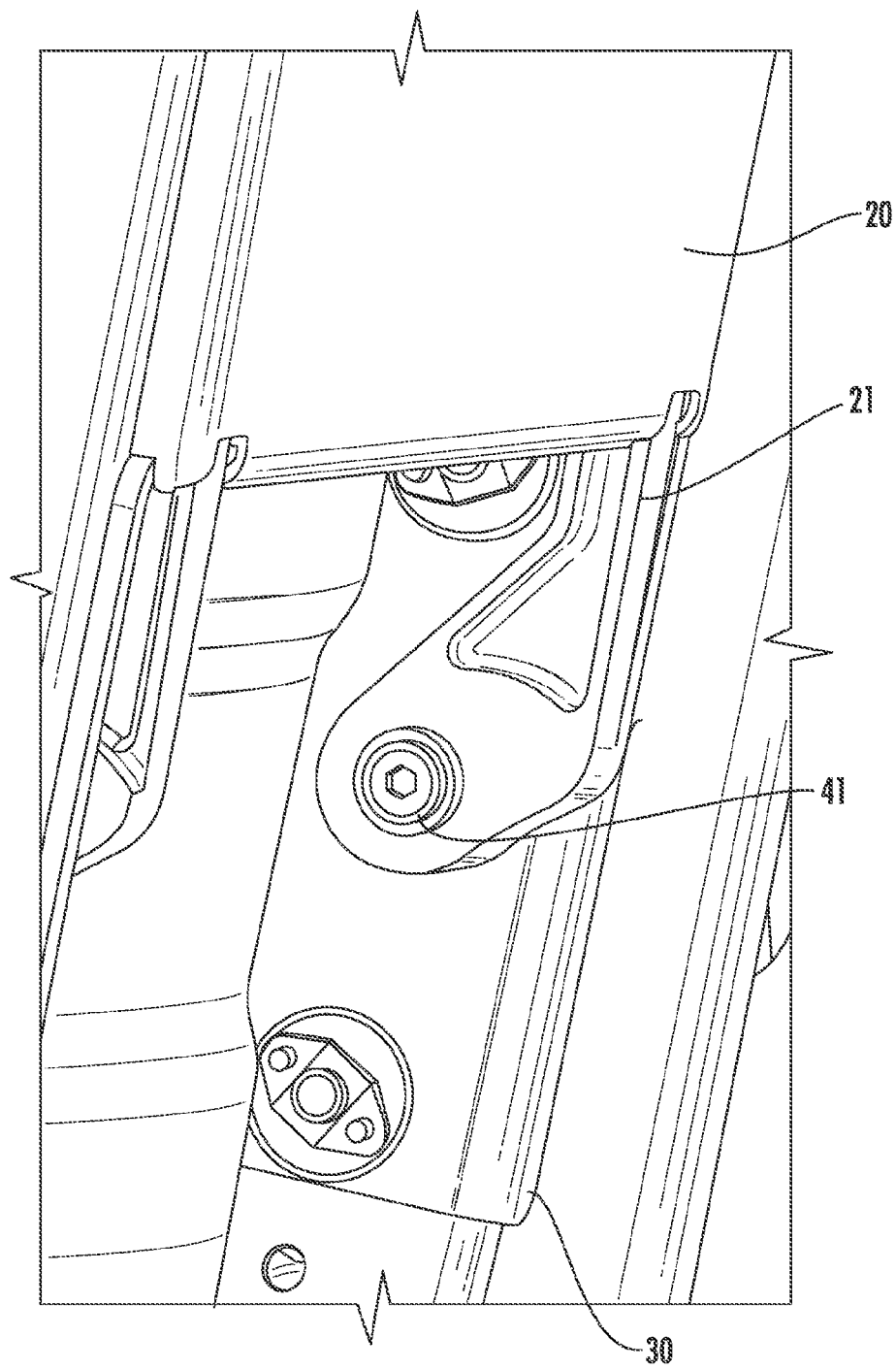
FIG. 13 is an enlarged perspective view of a pivot bar coupling, according to certain embodiments of the present invention.

FIG. 9, according to certain embodiments of the present invention, provides a perspective view of the pivot bar 30, which may include the protrusion 32, a fastener hole 36, and a projection 39. It should be appreciated that the pivot bar 30 may be integrated into the seat back frame 10, or formed as a separate part and otherwise affixed to the seat back frame 10 (as shown in FIGS. 11-13).

Figure 10:
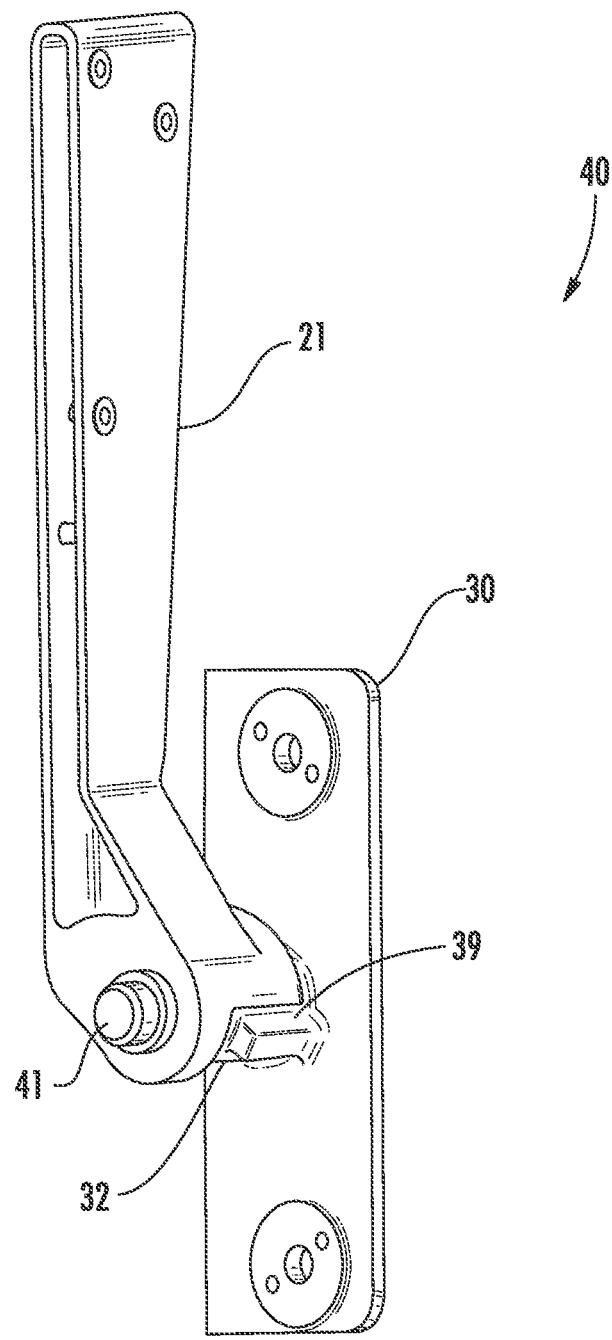
FIG. 10 is a perspective view of a pivot bar coupling, according to certain embodiments of the present invention.

According to certain embodiments of the present invention, as shown in FIG. 10, a pivot bar coupling 40 may include the tray table arm 21, the pivot bar 30, the protrusion 32, a projection 39, and a fastener 41.

In certain embodiments of the present invention, the tray table arm 21 may be pivotally coupled to the protrusion 32 and pivot bar 30. The protrusion 32 is located within the recess 25 (see FIGS. 7 and 8) of the tray table arm 21. The tray table arm 21 is affixed to the protrusion 32 with a fastener 41. The fastener 41 may comprise a multitude of different fasteners including, but not limited to, bolts, screws, pins, rivets, or any other fastener which may allow the tray table arm 21 to rotate about the protrusion 32. The projection 39 of the protrusion 32 is positioned to contact an edge of the aperture 24 to prevent further rotation of the tray table 20 in that direction (similar to the function of the down stop pin 35 described above). The projection 39 also serves as a load bearing surface to prevent additional rotation of the tray table arm 21 when a load is applied to the tray table 20.

Still referring to FIG. 10, it should be appreciated that it is not necessary to have an aperture 24 in the tray table arm 21 that is sized to allow the protrusion 32 to pass through the aperture 24 and into the recess 25 of the tray table arm 21, as discussed above. Rather, since a separate fastener may be used to couple the tray table arm 21 to the protrusion 32 (instead of relying on the geometry of the aperture 24 and the protrusion 32 to couple the tray table arm 21 to the pivot bar 30), the tray table arm 21 may be installed in a direction along a longitudinal axis of the fastener holes 36.

Nevertheless, the use of an aperture 24 that is sized to allow the protrusion 32 to pass through the aperture only when the aperture 24 is aligned with the opposing surfaces 38 of the protrusion 32 may still be desirable in certain embodiments. Notably, the tray table arm 21, and attached tray table 20, may be installed from a direction perpendicular to the axis of rotation of the tray table arm 21 about the protrusion 32. This direction of installation is preferable during manufacturing as it allows the tray table 20 and associated tray table arms 21 to be affixed to the pivot bars 30 as an assembly, greatly reducing installation times and labor costs. It should also be appreciated that the amount of rotation of the tray table arm 21 about the protrusion may be controlled and adjusted by the interaction of the size of the aperture 24 and the location and sizing of the projection 39 on the protrusion 32. These properties may also be adjusted to alter the angle of installation to best fit a particular manufacturing facility or product configuration. Finally, any of the pivot couplings of this or any other embodiments may be provided with a shroud that covers and protects the pivot coupling and associated components from damage or tampering.

As shown in FIG. 11, the pivot bars 30 may be affixed to the seat back frame 10. The tray table 20 and tray table arms 21 are oriented in a position such that the apertures 24 are substantially parallel with the narrowed dimensions between the opposing surfaces 38 of the protrusions 32. The tray table arms 21 may be guided or displaced such that the protrusions 32 pass through the apertures 24 and into the recesses 25. When the protrusions 32 are located within the recesses 25, the fastener holes 26 of the tray table arms 21 will align with the fastener holes 36 of the protrusions 32. The tray table 20 and tray table arms 21 may then rotate such that the apertures 24 are no longer in alignment with the opposing surfaces 38, and are captured by the interference of the curved surfaces 37 with the recesses 25 and the apertures 24. The tray table arms 21 and protrusions 32 may then receive a fastener in their respective fastener holes 26, 36.

FIG. 12 provides a perspective view of the passenger seat back 1 pivot bar coupling after the protrusions 32 have passed through the apertures 24 and the tray table 20 and tray table arms 21 have been rotated away from the installation alignment described above and depicted in FIG. 11. The fastener hole 26 of the tray table arm 21 is now aligned with the fastener hole (not shown) of the protrusion 32 and is ready to receive a fastener to securely affix the tray table arm 21 to the pivot bar 30 and seat back frame 10.

FIG. 13 provides a perspective view of the pivot bar coupling with the tray table 20 in a stowed position. The tray table arm 21 is affixed to the pivot bar 30 with a fastener 41. It should be appreciated that any type of suitable fastener, including screws, pins, bolts, rivets, or the like which allow for rotation of the tray table arm 21 about the pivot bar 30 may be used.

Figure 14:
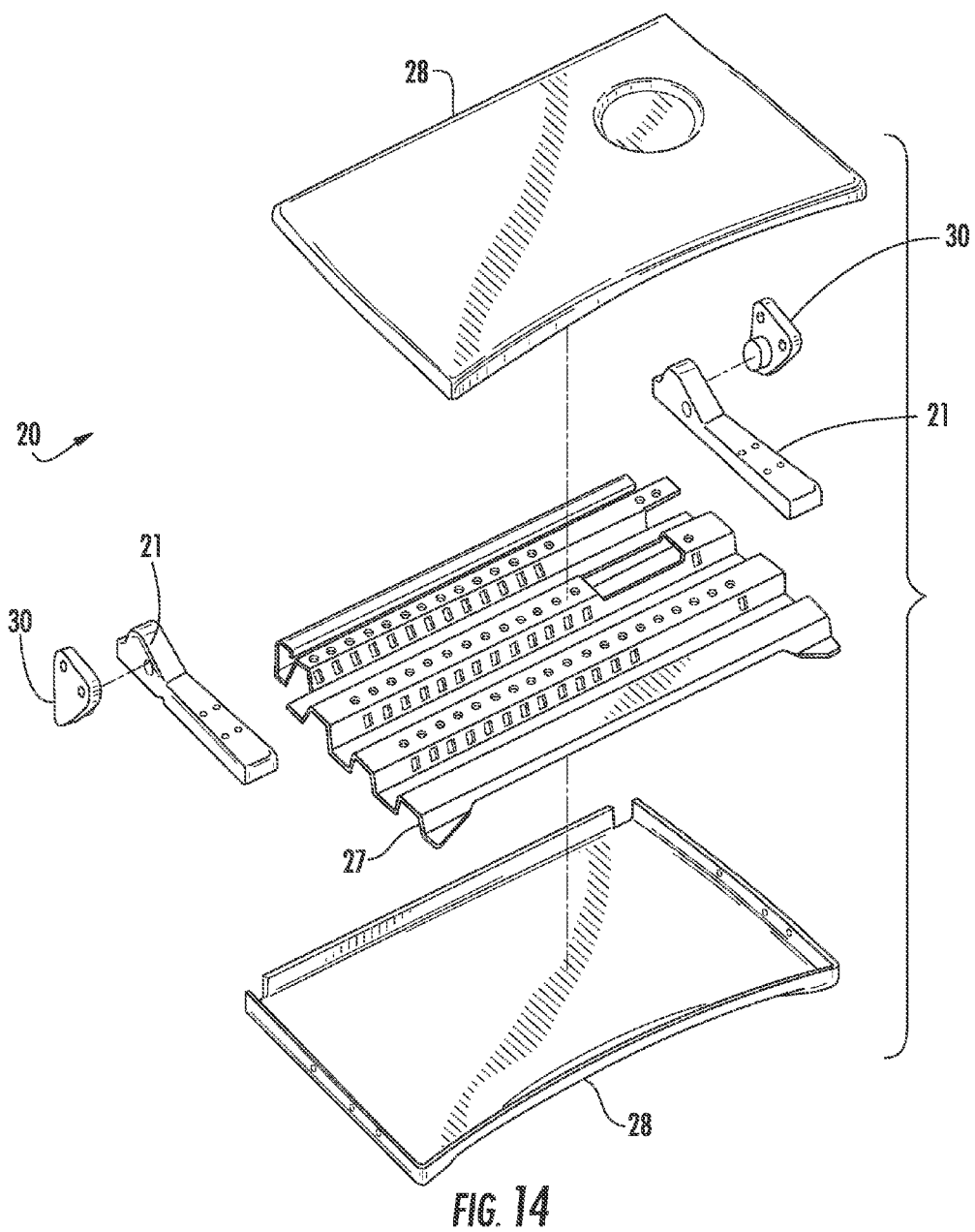
FIG. 14 is an exploded view of a tray table, according to certain embodiments of the present invention.
Figure 15:
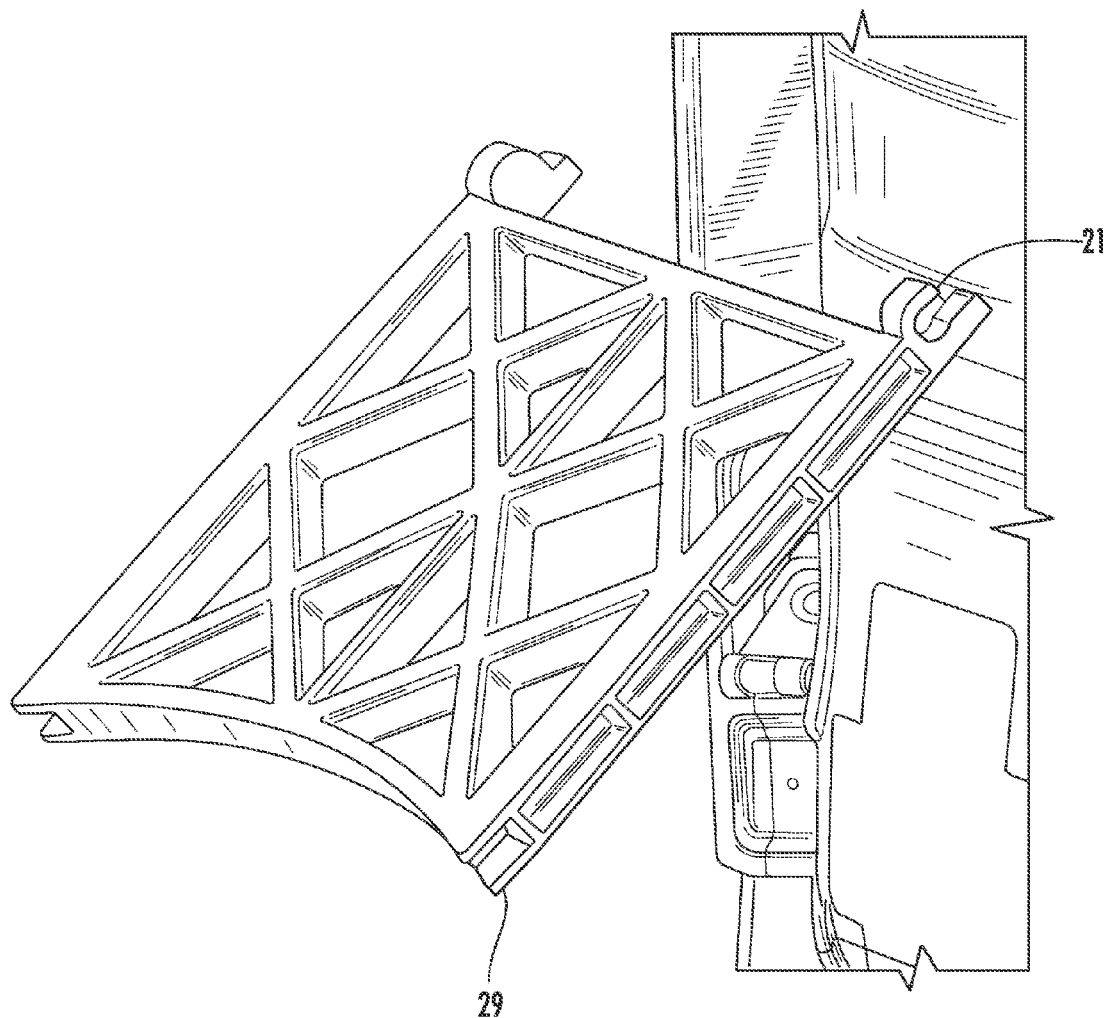
FIG. 15 is a perspective view of a single piece tray table support structure, according to certain embodiments of the present invention.

According to certain embodiments of the present invention, as shown in FIGS. 14 and 15, a tray table 20 may include tray table arms 21, a tray table support structure 27, tray table outer layers 28, pivot bars 30, or an integrated tray table support 29.

As shown in FIG. 14, the tray table 20 may be provided as an assembly which includes a tray table support structure 27 sandwiched between tray table outer layers 28. The tray table support structure 27 and tray table outer layers 28 may be affixed or otherwise attached to the tray table arms 21 and pivot bars 30. The constituent parts may then form an assembly which may be installed onto a passenger seat back frame (not shown). It should be appreciated that any of the aforementioned parts may be cast, stamped, molded, or otherwise formed from any suitable materials including but not limited to aluminum, stainless steel, nylon, aircraft steel, aramid fibers, polycarbonate, polypropylene, other metals or alloys, composites, or similar materials.

As shown in FIG. 15, according to certain embodiments of the present invention, an integrated tray table support 29 may incorporate tray table arms 21 into the tray table 20 as a single piece. The integrated tray table support 29 may be injection molded, cast, machined, or formed from any suitable material including, but not limited to, aluminum, stainless steel, nylon, aircraft steel, aramid fibers, polycarbonate, polypropylene, other metals or alloys, composites, or similar materials. It should be appreciated, however, that any tray table existing or yet to be developed may be used in conjunction with a seat back frame and a pivot bar coupling.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat comprising:
   a tray table pivotally coupled to a seat back frame with at least one pivot bar, wherein:
   the at least one pivot bar comprises a protrusion;
   the protrusion comprises a projection along its length; and
   the projection is unitary to the protrusion.

2. The passenger seat of claim 1, wherein the projection is positioned to contact an edge of an aperture of the tray table to constrain rotation of the tray table.

3. The passenger seat of claim 1, wherein the protrusion comprises a material selected from the group consisting of steel, aluminum, a polymer, or a composite.

4. The passenger seat of claim 1, wherein the protrusion comprises opposing flat surfaces and opposing curved surfaces along a length of the protrusion, the opposing flat surfaces alternating with the opposing curved surfaces around a circumference of the protrusion.

5. The passenger seat of claim 1, wherein the tray table comprises at least one tray table arm, the at least one tray table arm comprising an aperture.

6. The passenger seat of claim 5, wherein the at least one tray table arm comprises a material selected from the group consisting of steel, aluminum, a polymer, or a composite.

7. The passenger seat of claim 5, wherein the aperture is sized larger than a distance between opposing flat surfaces along a length of the protrusion and smaller than a distance between opposing curved surfaces along the length of the protrusion, the protrusion in communication with the seat back frame.

8. The passenger seat of claim 1,
   wherein the tray table comprises at least one tray table arm comprising an aperture;
   wherein the protrusion comprises a narrowed dimension across the protrusion that is narrower than an opening of the aperture; and
   wherein the opening of the aperture is narrower than all other dimensions across the protrusion.

9. The passenger seat of claim 1, wherein the at least one pivot bar is covered by a shroud.

10. The passenger seat of claim 1, wherein the tray table is secured by a down stop pin.

11. The passenger seat of claim 1, wherein the tray table is secured by a fastener.

12. The passenger seat of claim 1, wherein the projection extends around less than a full circumference of the protrusion.

13. A passenger seat comprising:
    a seat back frame comprising at least one pivot bar with a protrusion;
    a tray table comprising at least one tray table arm with an aperture that partially encloses a recess, wherein the protrusion is positioned within the recess;
    wherein the protrusion comprises a narrowed dimension across the protrusion that is narrower than an opening of the aperture; and
    wherein the protrusion comprises a projection extending along at least a portion of an axial direction of the protrusion, wherein the projection extends around less than a full circumference of the protrusion.

14. The passenger seat of claim 13, wherein the at least one pivot bar is covered by a shroud.

15. The passenger seat of claim 13, wherein the tray table is secured by a down stop pin.

16. The passenger seat of claim 13, wherein the tray table is secured by a fastener.

17. The passenger seat of claim 13, wherein the projection is unitary to the protrusion.

18. A method of manufacturing a passenger seat with a tray table pivotally coupled to a seat back frame, said method comprising:
    providing the seat back frame;
    providing a pivot bar comprising a protrusion in communication with the seat back frame;
    forming opposing flat surfaces along a length of the protrusion;
    providing a projection along at least a portion of a length of the protrusion;
    forming opposing curved surfaces along the length of the protrusion, the opposing flat surfaces alternating with the opposing curved surfaces around a circumference of the protrusion;
    providing the tray table with at least one tray table arm, the at least one tray table arm comprising an aperture, the aperture sized larger than a greatest distance between the opposing flat surfaces along the length of the protrusion, and sized smaller than a distance between the opposing curved surfaces along the length of the protrusion;
    aligning the aperture with the opposing flat surfaces of the protrusion;

displacing the aperture past the protrusion; and
rotating the aperture away from the opposing flat surfaces of the protrusion,
wherein the projection is unitary to the protrusion.

19. The method of claim 18, further comprising securing the at least one tray table arm with a down stop pin.

20. The method of claim 19, further comprising securing the at least one tray table arm with a fastener.

* * * * *